United States Patent [19]

Kano et al.

[11] 4,091,258

[45] May 23, 1978

[54] ARC WELDING PROCESS

[75] Inventors: Motomi Kano, Fujisawa; Keiichiro Hirakoso, Funabashi; Yasuhiro Nagai, Chigasaki; Toshio Horiuchi, Kamakura, all of Japan

[73] Assignee: Kobe Steel, Ltd., Kobe, Japan

[21] Appl. No.: 707,537

[22] Filed: Jul. 22, 1976

[30] Foreign Application Priority Data

Jul. 22, 1975 Japan .................................. 50-88880

[51] Int. Cl.² .................................................. B23K 9/12

[52] U.S. Cl. ........................... 219/125.12; 219/137 R; 219/137.71

[58] Field of Search ..................... 219/124, 130, 131 F, 219/135, 137 PS, 137 R

[56] References Cited

U.S. PATENT DOCUMENTS

| | | | |
|---|---|---|---|
| 2,280,770 | 4/1942 | Anderson | 219/124 |
| 3,053,975 | 9/1962 | Nelson et al. | 219/130 |
| 3,350,539 | 10/1967 | Manz et al. | 219/137 PS |
| 3,818,176 | 6/1974 | Brown | 219/131 F |
| 3,832,522 | 8/1974 | Arikawa et al. | 219/137 R |
| 3,956,610 | 5/1976 | Kanbe et al. | 219/131 F |

FOREIGN PATENT DOCUMENTS

| | | | |
|---|---|---|---|
| 253,268 | 2/1970 | U.S.S.R. | 219/137 R |
| 323,211 | 2/1972 | U.S.S.R. | 219/124 |

*Primary Examiner*—J. V. Truhe
*Assistant Examiner*—Clifford C. Shaw
*Attorney, Agent, or Firm*—Oblon, Fisher, Spivak, McClelland & Maier

[57] ABSTRACT

An arc welding process having a welding arc generated between a consumable electrode and the materials to be welded and a welding torch is oscillated along the welding joint line, wherein the arc length is longer when the welding torch is located at the forward side of the oscillation than when the welding torch is located at the backward side of the oscillation with respect to the weld advancing direction, whereby sufficient penetration is obtained.

7 Claims, 11 Drawing Figures

1
2
3
1'
6
$\ell_1$

ARC WELDING PROCESS

BACKGROUND OF THE INVENTION

1. Field of the Invention

The present invention relates generally to an arc welding process, and more particularly to an arc welding process having a welding arc generated between a consumable electrode and the materials to be welded and a welding torch is oscillated along the welding joint line, wherein the arc length is longer when the welding torch is located at the forward side of the oscillation than when the welding torch is located at the backward side of the oscillation with respect to the weld advancing direction.

2. Description of the Prior Art

Various welding processes wherein a consumable electrode is oscillated across the welding line to weld a butt joint or fillet joint have been proposed as, for example in U.S. Pat. No. 3,742,184 to Kobe Steel, Ltd. and U.S. Pat. No. 3,832,522 to Kobe Steel, Ltd. However, these processes cannot be applied to the narrow gap I groove butt welding of thick plates.

U.S. Pat. No. 2,280,770 to General Electric Company proposed a welding machine capable of oscillating back and forth a welding torch along a weld joint line for use in tack welding. Further, U.S. Pat. No. 3,818,176 to The Welding Institute proposes a welding process wherein the porosity of weld is reduced by a stirring action in the weld pool caused by an oscillation of the welding torch across and/or along the weld joint line.

Nevertheless, even with the above mentioned conventional welding techniques, a deep and sufficient penetration to the groove face located on both sidewise portions of the welding line is not obtained with complete satisfaction when extremely thick plates are butt welded with a narrow gap I groove.

Accordingly, an arc welding technology has long been desired that enables to obtain sufficient penetration in case of welding of narrow gap I groove of thick plates.

SUMMARY OF THE INVENTION

Accordingly, it is an object of the present invention is to provide a new and better arc welding process useful to obtain a wide penetration width along the welding line.

Another object of the present invention is to provide a new and better arc welding process capable of obtaining an extremely good penetration free from lack of fusion when a narrow gap I groove of thick plates is welded.

The foregoing these and other objects of the present invention may be readily attained in accordance with the present invention wherein an arc welding process having a welding arc generated between a consumable electrode and the materials to be welded and a welding torch is oscillated back and forth along the welding line, wherein the arc length as the welding torch is at the forward side of the oscillation is longer than the arc length when the welding torch is at the back side of the oscillation with respect to the weld advancing direction.

The present invention is most beneficial when applied to a narrow gap butt welding of thick plates.

The present invention further contemplates interruption of the oscillation of the welding torch for an infinitesimal time period at the forward most end position of the oscillation with respect to the weld advancing direction.

A further aspect of the present invention includes the welding process described above being applied to flat position welding.

A still further aspect of the present invention includes the particle transfer of the welding process being is spray transfer.

A still further aspect of the present invention is an arc welding process as described above wherein the oscillation width of the welding electrode is 5 – 25 mm.

A still further aspect of the present invention is an arc welding process as described above wherein the oscillation frequency of the welding torch is 30 – 70 cycles per minute.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which the reference characters designate like or corresponding parts throughout the several views, and wherein:

FIGS. 1(a) – (c) are explanatory showings of the process according to the present invention, wherein FIG. 1(a) is a cross sectional view of the welding groove when a welding torch is at the forward side of the oscillation with respect to the weld advancing direction;

FIG. 1(b) is a cross sectional view of the welding groove when a welding torch is at the backward side of the oscillation, and FIG. 1(c) is a longitudinal cross sectional view of the welding groove showing the change in arc length when the welding torch changes its position back and forth with respect to the weld advancing direction;

FIG. 4 is a comparison of cross sectional macro views showing the penetration condition, wherein

DETAILED DESCRIPTION OF THE PREFERRED EMBODIMENTS

Figure 1A:
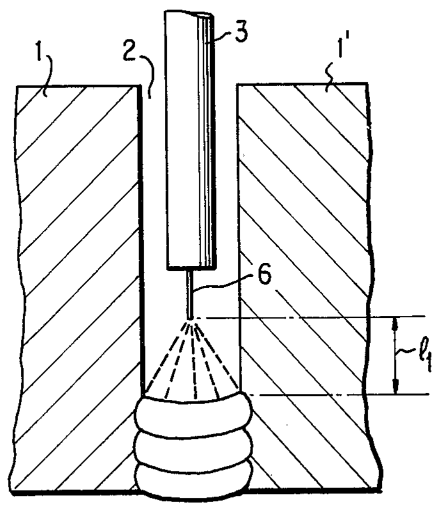
Figure 1B:
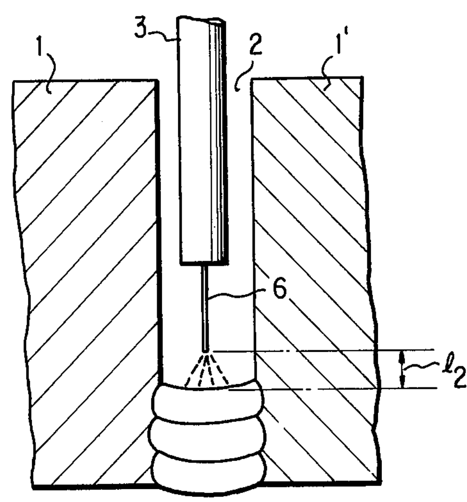
Figure 1C:
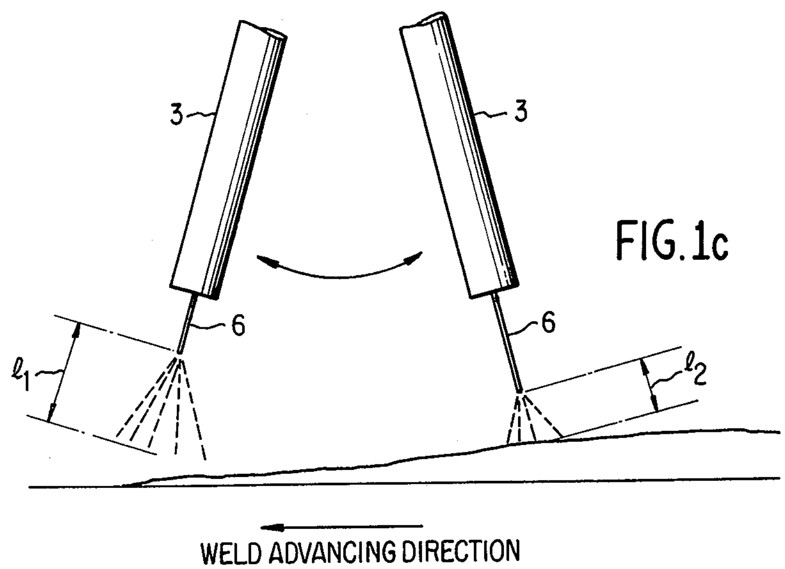

The arc welding process of the invention is hereinafter explained in detail along with the attached drawings. In FIGS. 1(a) and 1(b), a consumable welding electrode 6 is guided through welding tip 3 to narrow gap I groove 2 of the materials 1, 1' to be welded wherein the tip 3 is positioned at the mid point of the groove 2. The welding tip 3 is oscillated along the weld joint line of the narrow gap I groove at a certain oscillation period, and at the same time the nozzle 3 advances along the joint line. As shown is FIG. 1(a), are length $l_1$ is lengthened when the welding tip 3 is at the forward side of the oscillation with respect to the weld advancing direction, i.e., the welding voltage is increased to extend the arc length resulting in widening the penetration width in order to improve the penetration into the groove face located both sides of the groove. Thereafter the welding zone on the backward side of the oscillation is welded with a proper welding voltage. Explaining now along with FIG. 1(c), arc length $l_1$, and $l_2$ are varied during the back and forth oscillation of the welding torch. When the arc length is long, the welding arc extends to enable it penetrate a wide region of the groove without weaving the welding torch across the welding line. When the arc length is short a necessary amount of molten metal is fed mainly onto the deposited metal to obtain the required deposited weld metal.

In accordance with the present invention, the oscillation of the welding torch may be interrupted for an infinitesimal period of time at the forward most end portion of the oscillating welding torch in the weld advancing direction.

This interruption is provided for increasing the heat input into the welding groove face located on both side portions of the groove so as to thoroughly improve the penetration to the groove face. If the period of interruption of the welding torch oscillation is too short, the above mentioned effect cannot be achieved, so that at least 0.1 second is necessary. If the interruption period is too long, excessive heat input would strike the welding zone, causing to enlarge the penetration and the molten metal would flow ahead over the unmelted portion of the groove, which results in retaining non-fused parts ahead of the welding zone and embrittlement of the heat affected zone will appear because of excessive heat input. For the above reasons, the interruption period should be not longer than 1.0 second. Provision of the oscillation interruption is advantageous especially in case of a wide groove width.

The oscillation width of the welding electrode is preferably limited from 5 to 25 mm. If less than 5 mm expected effects by oscillation cannot be achieved, and if over 25 mm the molten pool at the portion which is not struck by the welding arc solidifies resulting in discontinuation of deposited metal which may cause insufficient penetration.

The oscillation frequency is preferably limited from 30 to 70 cycles per minute. If less than 30 c.p.m. the molten pool at the portion which is not struck by the welding arc solidifies resulting in the above-mentioned defects, and if over 70 c.p.m. the arc stability cannot be maintained.

Comparative test data is now explained in order to show the superiority of the arc welding process of the present invention.

Figure 2A:
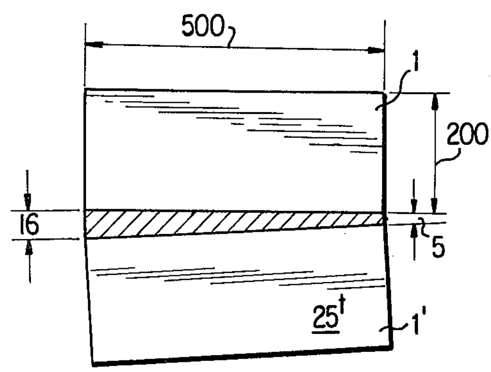
FIG. 2(a) is a plan view of the plates to be test welded.
Figure 2B:
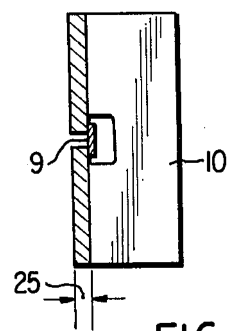
FIG. 2(b) is a plan view of the plate for restraining the plates to be test welded.

As shown in FIG. 2(a), welding test plates 1, 1' are used wherein the groove width is continuously changed in advance of the weld joint line, and the welding heat input was kept substantially constant through three welding tests. FIG. 2(b) shows a plan view of the plate for restraining the plates to be welded and the backing metal 9 positioned at the back side surface of the plates to be welded. Three plates for restraint were used and tack welded to the back side of the plates to be welded.

Three different types of welding processes are (I) welding torch is oscillated along the weld joint line without varying the arc length.

(II) welding torch is oscillated along the weld joint line with a long arc length as the torch is at the backward side of the oscillation width, and with a short arc length as the torch is at the forward side of the oscillation width. and (III) welding torch is oscillated along the weld joint line with a long arc length as the torch is at the forward side of the oscillation width, and with a short arc length as the torch is at the backward side of the oscillation width, and further providing the interruption of oscillation movement as the torch is at the forward most end with respect to the weld advancing direction.

Figure 3:
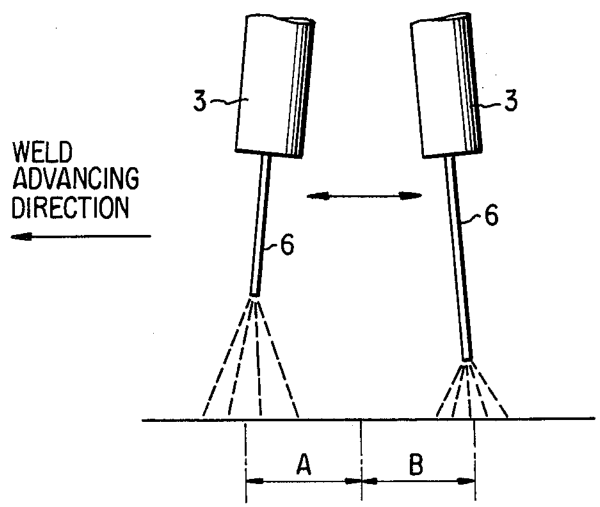
FIG. 3 is a schematic view showing the oscillation of the welding torch in accordance with the arc welding process of the invention.

Welding conditions of the above three process are shown in Table 1. In this comparative test, according to welding process III, as shown in FIG. 3, the arc length is longer in region A and the arc length is shorter in region B, as in accordance with the invention, however vice versa in accordance with the welding process (II).

Table 1

| Welding process<br>Welding condition | Welding Conditions<br>I | <br>II | <br>III<br>(Invention) |
|---|---|---|---|
| Shielding Gas | 80% Ar + 20% $CO_2$ | 80% Ar + 20% $CO_2$ | 80% Ar + 20% $CO_2$ |
| Oscillation Frequency | 50 cycles/min. | 50 cycles/min. | 50 cycles/min. |
| Oscillation Width | 10 mm | 10 mm | 10 mm |
| Interruption Period at the forward most end of oscillation | 0 | 0 | 0.2 sec. |
| Welding Current & Voltage | 370 A - 32 V | 350 A - 29 V (short arc length) 400 A - 37 V (long arc length) | 350 A - 29 V (short arc length) 400 A - 37 V (long arc length) |
| Heat input | 23,680 joule/cm | 24,950 joule/cm | 24,950 joule/cm |

Figure 4A:
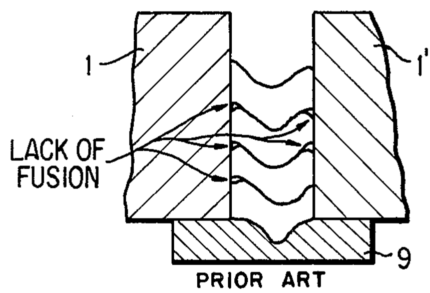
FIG. 4(a) is a cross sectional macro view of the weld obtained in accordance with the conventional arc welding process an FIG. 4(b) is a cross sectional macro view of the weld obtained in accordance with the process of the invention.
Figure 4B:
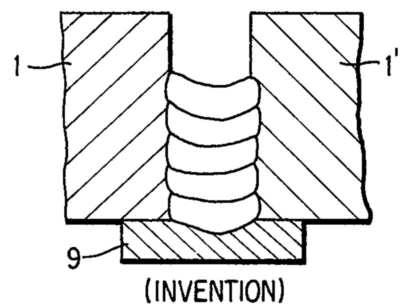

As the results of the above test, in accordance with the welding process (I), insufficient penetration (lack of fusion) was observed at both side surfaces of the grooves when the gap of the groove is wider than 11 mm, as shown in FIG. 4(a).

Also, in accordance with the welding process (II), when the gap is wider than 13 mm, lack of fusion was observed as in FIG. 4(a).

However, according to the welding process (III), i.e., in accordance with one imbodiment of the present invention, sufficient penetration and therefore a sound weld could be obtained even if the gap is as wide as 14 mm.

Figure 7:
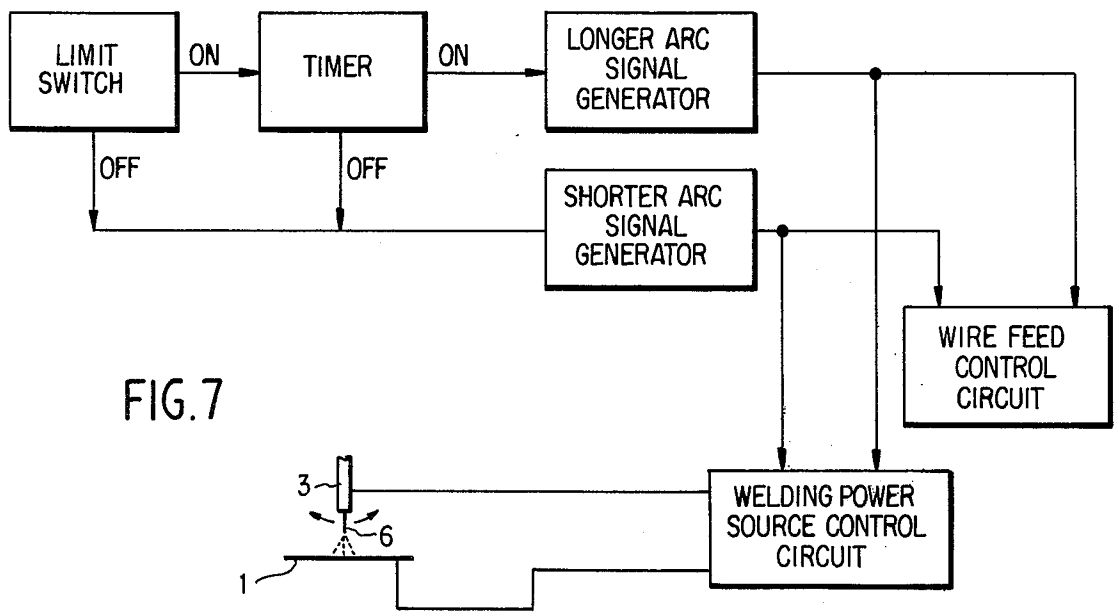
FIG. 7 is a block diagram showing the control mechanism of the apparatus of FIGS. 5 and 6.

A welding apparatus for carrying out the arc welding process of the invention is hereinafter described referring to FIGS. 5, 6 and 7.

Figure 5:
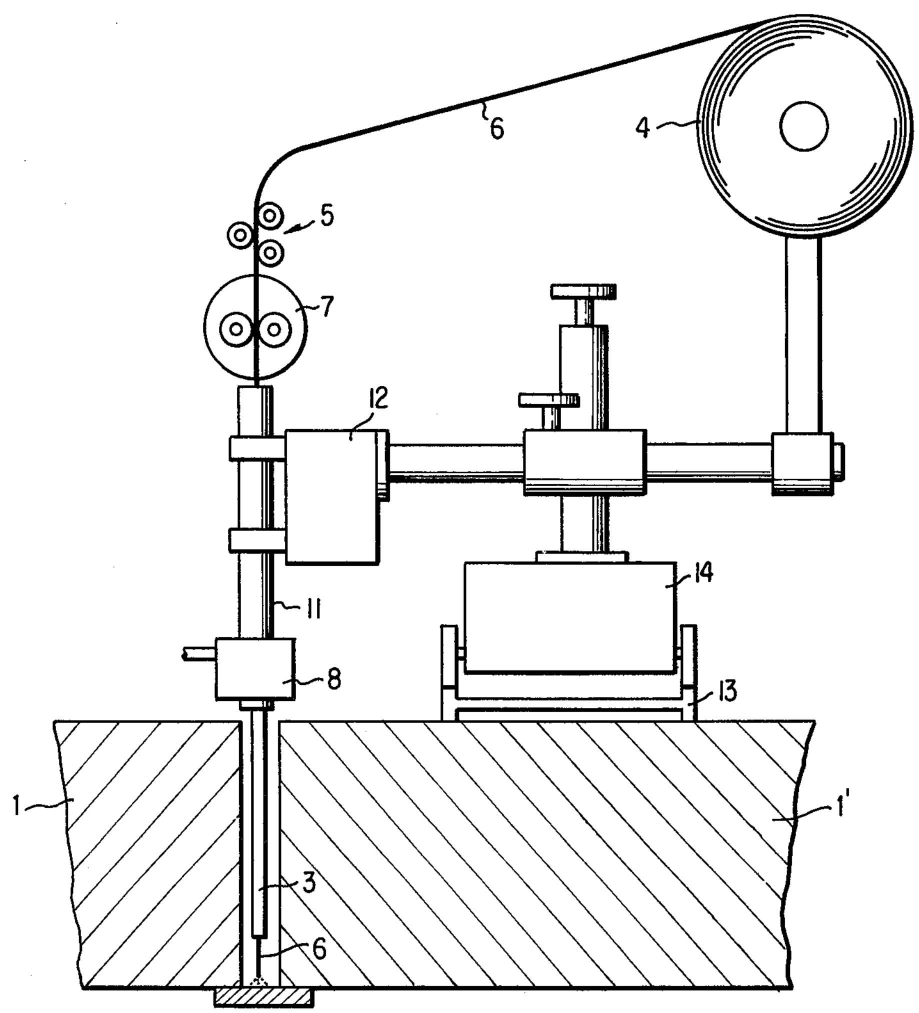
FIG. 5 is a side view of the welding apparatus performing the arc welding process of the invention.

FIG. 5 is a side view showing a welding apparatus for carrying out the arc welding process, wherein 1 and 1' are materials to be welded, 3 is a welding tip, 4 is a reel unwinding a consumable electrode wire, 5 is wire strainer, 6 is a consumable electrode wire, 7 is a wire feeding motor, 8 is a jig for applying welding current to the wire, 11 is welding torch, 12 is an oscillating device, 13 is a rail, and 14 is a carriage.

A consumable electrode wire 6 is fed by a wire feeding motor 7 from the reel 4 through welding torch 11 and tip 3 to the welding portion. The welding torch 11 is oscillated back and forth along the welding line by an oscillating device 12 loaded on a carriage 14, and travels along the welding line towards the weld advancing direction since the carriage 14 travels on a rail 13 parallel to the welding line. FIG. 6 is a schematic explanatory view of the oscillating device 12, showing a further detailed mechanism of the device 12, in which 11 is an welding torch, 15 is oscillating motor, 16 is a driving gear, 17 is a driven gear, 18 is a striker for changing the arc length, 19 is a limit switch for changing the arc length, 20 is a connecting rod, 21 is a fulcrum of the welding torch 11, 22 is a limit switch for interruption of welding torch oscillation, 23 is a welding torch connecting bar, 24 is an aperture for adjusting the oscillation width of the welding torch, and 25 is an aperture for adjusting the timing of the arc length change. Oscillating motor 15 rotates in a direction of the arrow together with a driving motor 16, and a driven motor 17 rotates in a clockwise direction. An aperture 24 is provided within the driven gear 17 for fixing one end of the connecting rod 20, the other end of which is connected to the welding torch connecting bar 23 so as to adjust an oscillating width of the welding torch 11 by fixing the one end of the connecting rod 20 in a proper position of the aperture 24. Another aperture 25 within the driven gear 17 is provided for fixing the intermediate portion of the striker 18 which rotates with the driven gear 17 so as to adjust the timing of the change in arc length by properly fixing the intermediate portion of the striker 18. The striker 18 puts a limit switch 19 on when the welding torch 11 moves from backward to forward of the oscillation width along the weld advancing direction, then as shown in FIG. 7 actuates a timer to change the arc length to be longer by means of a longer arc signal and keep the lengthened arc length for a predetermined time period by providing a longer arc signal to the wire feed control circuit and to the welding power source control circuit. As a result, a welding arc having a longer length is generated between the wire 6 and the plates 1, 1' to be welded when the welding torch is located at the forward side of the oscillating width. When, when the welding torch is at the other position, limit switch 19 remains off and a timer also remains off, such that as shown in FIG. 7, a shorter arc signal generator generates a shorter arc signal to properly order to wire feed control circuit and the welding power source control circuit to keep the arc length to be comparatively shorter.

Figure 6:
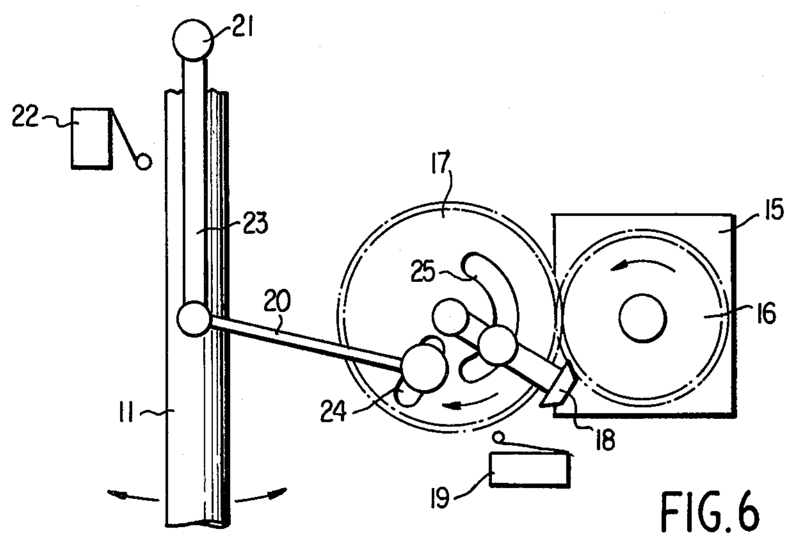
FIG. 6 is a schematic explanatory view of the structure of the apparatus of FIG. 5.

A limit switch 22 shown in FIG. 6, may be provided to be put on by the welding torch 11 when the torch is at the forward most end position of the oscillating width, if an interruption of oscillation movement of the torch 11 is desired to be provided.

When limit switch 22 is put on, then a timer (not shown) is actuated to stop the rotation of the oscillating motor 15 for in infinitesimal time period so as to eventually interrupt the oscillation movement of the welding torch 11.

The arc welding process of the invention, as described above, can also be applied to fillet welding.

Obviously, many modifications and variations of the present invention are possible in light of the above teachings. It is to be understood therefore that within the scope of the appended claims, the present invention may be practiced otherwise than as specifically described herein.

We claim:

1. An arc welding process wherein a length of welding arc is generated between a consumable electrode and the materials to be welded along a weld joint line comprising the steps of:

advancing said electrode in a direction along said weld joint line;

oscillating a welding torch back and forth and parallel to the weld joint line, and varying the arc length generated by said consumable electrode when the welding torch is at its forward position in said direction of advancement so as to be longer than the arc length when said welding torch is at its rearward position in said direction of advancement.

2. An arc welding process according to claim 1, wherein said arc welding process is applied to a narrow gap butt welding of thick plates.

3. An arc welding process according to claim 1, wherein the oscillation of the welding torch is interrupted for 0.1 to 1.0 second at a forward most end position of the oscillation with respect to the weld advancing direction.

4. An arc welding process according to claim 1, wherein said process includes positioning said material flat prior to said welding arc generation.

5. An arc welding process according to claim 1, wherein particle transfer of said consumable electrode is by spray transfer.

6. An arc welding process according to claim 1, including the step of limiting oscillation width of the welding electrode to 5 - 25 mm.

7. An arc welding process according to claim 1, wherein the oscillation frequency of the welding torch is 30 - 70 cycles per minute.

* * * * *